United States Patent
Xu et al.

(10) Patent No.: US 12,182,849 B2
(45) Date of Patent: Dec. 31, 2024

(54) PRODUCT RECOMMENDATIONS BASED ON CHARACTERISTICS FROM END USER-GENERATED TEXT

(71) Applicant: Home Depot Product Authority, LLC, Atlanta, GA (US)

(72) Inventors: Tianlong Xu, Atlanta, GA (US); Haozheng Tian, Atlanta, GA (US); Nian Yan, Dunwoody, GA (US); Harish Nair, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/420,362

(22) Filed: Jan. 23, 2024

(65) Prior Publication Data

US 2024/0161168 A1   May 16, 2024

Related U.S. Application Data

(63) Continuation of application No. 17/588,864, filed on Jan. 31, 2022, now Pat. No. 11,928,720.

(51) Int. Cl.
| | |
|---|---|
| *G06Q 30/00* | (2023.01) |
| *G06F 40/40* | (2020.01) |
| *G06Q 30/0282* | (2023.01) |
| *G06Q 30/0601* | (2023.01) |

(52) U.S. Cl.
CPC ......... *G06Q 30/0631* (2013.01); *G06F 40/40* (2020.01); *G06Q 30/0282* (2013.01); *G06Q 30/0627* (2013.01)

(58) Field of Classification Search
None
See application file for complete search history.

(56) References Cited

U.S. PATENT DOCUMENTS

| | | |
|---|---|---|
| 9,400,778 B2 | 7/2016 | Ramani |
| 10,203,847 B1 | 2/2019 | Haitani |
| 10,423,999 B1 | 9/2019 | Murtaza |

(Continued)

FOREIGN PATENT DOCUMENTS

| | | |
|---|---|---|
| WO | 2012106133 A2 | 8/2012 |

OTHER PUBLICATIONS

International Search Report/ Written Opinion issued in appl. No. PCT/US2023/061585, dated Jul. 3, 2023, 14 pgs.

*Primary Examiner* — Mila Airapetian
(74) *Attorney, Agent, or Firm* — Greenberg Traurig, LLP

(57) ABSTRACT

A method for generating a related product interface portion in an electronic user interface based on user-generated text includes identifying, for each product of a plurality of products, one or more respective characteristics from end user-generated text associated with the product, whereby a plurality of characteristics are identified for the plurality of products. The method further includes determining a plurality of characteristic groups, each group comprising two or more of the plurality of characteristics, wherein the characteristics within a group are similar to each other; receiving, from a user through the electronic user interface, an input related to a product category; and in response to receiving the user input, generating and presenting the related product interface portion that includes a respective product from each of the two or more of the characteristic groups related to the category.

20 Claims, 5 Drawing Sheets

(56) References Cited

U.S. PATENT DOCUMENTS

| | | |
|---|---|---|
| 2004/0143600 A1 | 7/2004 | Musgrove |
| 2010/0268661 A1 | 10/2010 | Levy |
| 2012/0197631 A1 | 8/2012 | Ramani |
| 2013/0262979 A1 | 10/2013 | Gu |
| 2016/0192188 A1 | 6/2016 | Coulier |
| 2017/0372398 A1* | 12/2017 | Kopru ................ G06Q 30/0627 |
| 2020/0104898 A1 | 4/2020 | Cui |
| 2020/0372073 A1 | 11/2020 | Dahl |
| 2021/0073891 A1 | 3/2021 | Al Jadda |
| 2021/0192460 A1* | 6/2021 | Xu .................... G06Q 10/1053 |
| 2023/0196741 A1 | 6/2023 | Raghavan |
| 2024/0281857 A1* | 8/2024 | Trinh ..................... G06F 18/23 |

* cited by examiner

PRODUCT RECOMMENDATIONS BASED ON CHARACTERISTICS FROM END USER-GENERATED TEXT

CROSS-REFERENCE TO RELATED APPLICATION

This application is a continuation of U.S. patent application Ser. No. 17/588,864, the contents of which are incorporated herein in their entirety and for all purposes.

TECHNICAL FIELD

This disclosure generally relates to presentation of one or more recommended products on an electronic interface, the products recommended based on a shared feature derived from end user-generated text, including but not limited to reviews.

BACKGROUND

Some consumer-facing websites include product recommendations to notify or introduce users to products that they may not otherwise find. These product recommendations may be based on characteristics of the products themselves, or based on backend data collected regarding the products.

DETAILED DESCRIPTION

Known product recommendation systems generally do not utilize information or data included in reviews that are left by end users that have experience with the relevant products. A novel product recommendation system according to the present disclosure may improve upon known systems and methods by deriving characteristics of products from their respective end user-generated text, such as reviews, associating products with each other based on those characteristics, and presenting these associated products to a user.

Figure 1:
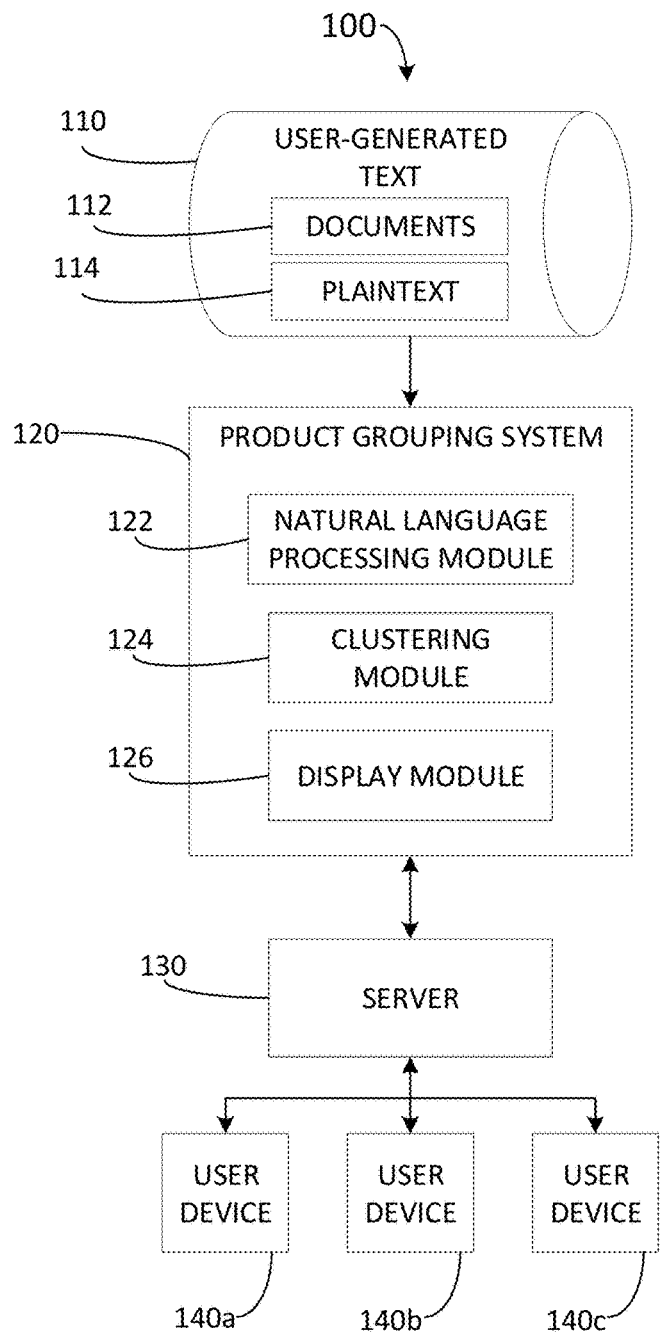
FIG. 1 is a diagrammatic view of an example system for providing a product recommendation to a user based on characteristics derived from end user-generated text.

Referring now to the drawings, wherein like numerals refer to the same or similar features in the various views, FIG. 1 is a diagrammatic view of an example system 100 for providing product recommendations for a user based on user-generated text, such as user reviews of products. The system 100 may include a source of user-generated text 110 and a product grouping system 120 that may include one or more functional modules 122, 124, and 126 embodied in hardware and/or software. In an embodiment, the functional modules 122, 124, and 126 of the product grouping system 120 may be embodied in a processor and a memory (i.e., a non-transitory, computer-readable medium) storing instructions that, when executed by the processor, cause the processor to perform the functionality of one or more of the functional modules and/or other functionality of this disclosure.

The user-generated text 110 may include a set of documents 112 and a set of plaintext 114. In some embodiments, the documents 112 may be documents that describe or relate to one or more products that are available for purchase through an electronic user interface, such as an e-commerce website, application, or the like. In such an interface, each document may be respective of a respective product, such as product information pages. The documents 112 may contain information about the products, such as specifications for the products, and may include reviews for the products that are generated by end-users (e.g., users that have used the product in some capacity) and/or other end user-generated text. These reviews may include a rating for the product, answers to one or more questions regarding the product, characteristics of the product that the user identified or appreciated, and/or a summary of the end-user's experience with the product. The plaintext 114 may include files that include reviews of one or products available for purchase through the e-commerce website. In contrast to the documents 112, the plaintext 114 corresponding to each product may contain only a portion of the reviews related to the product (e.g., the summary of the end-user's experience). In some embodiments, each product may be associated with a respective plaintext file, such that the plaintext file for a given product may contain all (or substantially all) of the reviews left for that product, while in other embodiments, each review for a product may be stored in a respective plaintext file. As will be described below, the plaintext 114 may be derived from the documents 112 by the product grouping system 120, in some embodiments.

As noted above, the user-generated text 110 may include product reviews, as well as other text generated by end users—questions, answers, etc. For ease of description, the user-generated text will be referred to below simply as "reviews," but it should be understood that such description is not intended to limit to the user-generated text to reviews only.

The functional modules 122, 124, and 126 of the product grouping system 120 may include a natural language processing module 122 that is configured to receive data from the user-generated text 110 (e.g., documents 112, plaintext 114) and derive one or more characteristics from the user-generated text 110. These characteristics may be features of the products associated with each document 112 or plaintext 113, and may be objective qualities (e.g., "multi-functional," "rechargeable battery") or relative qualities (e.g., "budget friendly," "most powerful"). In some embodiments, the language processing module 122 includes a machine learning model that, once trained, can derive characteristics from the review data. This machine learning model may be a Question-Answering (QA), which produces an output by answering questions using the analyzed input. One such QA model may be a Bidirectional Encoder Representations from Transformers (BERT) model. By training the QA model to ask questions directed to deriving features from product reviews (e.g., "What is this product best used for?," "What does this product do well?"), the natural language processing module 122 may receive review data from the user-generated text 110 and output one or more characteristics from each review datum.

The functional modules 122, 124, and 126 of the product grouping system 120 may also include a clustering module 124 configured to receive the determined characteristics from the natural language processing module 122 and to group the characteristics based on a hierarchical clustering algorithm. In some embodiments, the clustering module 124 may first transform each derived characteristic into an embeddings vector (e.g., via a universal sentence encoder model). In those embodiments, a similarity of the characteristics may be determined based on a relative distance between their vectors. The distances may be determined according to a cosine similarity, a Euclidean distance, or another appropriate vector distance calculation. The characteristics may then be grouped (or clustered) based on the relative distance, such that all characteristics in a group or cluster have a vector within a threshold distance from a respective vector of another characteristic in the group. This threshold value may be pre-determined, or may be based on a silhouette score, such that a threshold value is chosen to maximize the silhouette score.

In some embodiments, the clustering module 124 may take a bottom-up (or agglomerative) approach by first selecting a characteristic embeddings vector and building a cluster around that embeddings vector by grouping those embeddings vectors within a threshold distance of the first embeddings vector. Once this process is repeated for each characteristic embeddings vector, the clustering module 124 may form larger clusters by grouping the individual clusters. In other embodiments, the clustering module 124 may take a top-down approach by starting with a cluster that includes all embeddings vectors. A central embeddings vector may be determined (e.g., as the embeddings vector with the shortest average distance relative to the other embeddings vectors) and removing those vectors that are above a threshold distance away from the central vector. Those removed vectors may then themselves be clustered, and the process is repeated until each cluster contains only those vectors within a threshold distance of the respective central vector.

The clustering module 124 may further determine a representative characteristic (e.g., a representative word or phrase) for each cluster. The clustering module 124 may determine the representative characteristic based on a frequency within the cluster (e.g., the representative characteristic is the mode characteristic within the cluster) or based on a confidence score associated with each characteristic (e.g., the representative characteristic is the characteristic in the cluster with the highest confidence score). The confidence score may be an output of the natural language processing module 122, for example, and may reflect a relative accuracy of the determination of the characteristic by the natural language processing module 122.

The functional modules 122, 124, and 126 of the product grouping system 120 may also include a display module 126 configured to determine an order or appearance of clusters for user presentation. The display module 126 may receive the clusters from the clustering module 124 and then may determine a representative product (or products) for each cluster. The representative product may be determined based on a relative popularity of each product within the cluster, a confidence value for the product (i.e., how accurate the derived characteristic is associated with the product), or on a similar metric. In some embodiments, the representative product is the product most often associated with the representative characteristic (e.g., the representative characteristic is mentioned most often in reviews of the representative product).

The system 100 may further include a server 130 in electronic communication with the product grouping system 120 and with a plurality of user computing devices 140a, 140b, and 140c. The server 130 may provide a website, data for a mobile application, or other interface through which the users of the user computing devices 140 may navigate and otherwise interact with the products associated with user-generated text 110. In some embodiments, the server 130 may receive an indication of a representative product(s) from the product grouping system, and provide the representative product(s) with a description of the respective cluster to the user (e.g., through the interface). The description may be the representative characteristic associated with the cluster.

Figure 2:
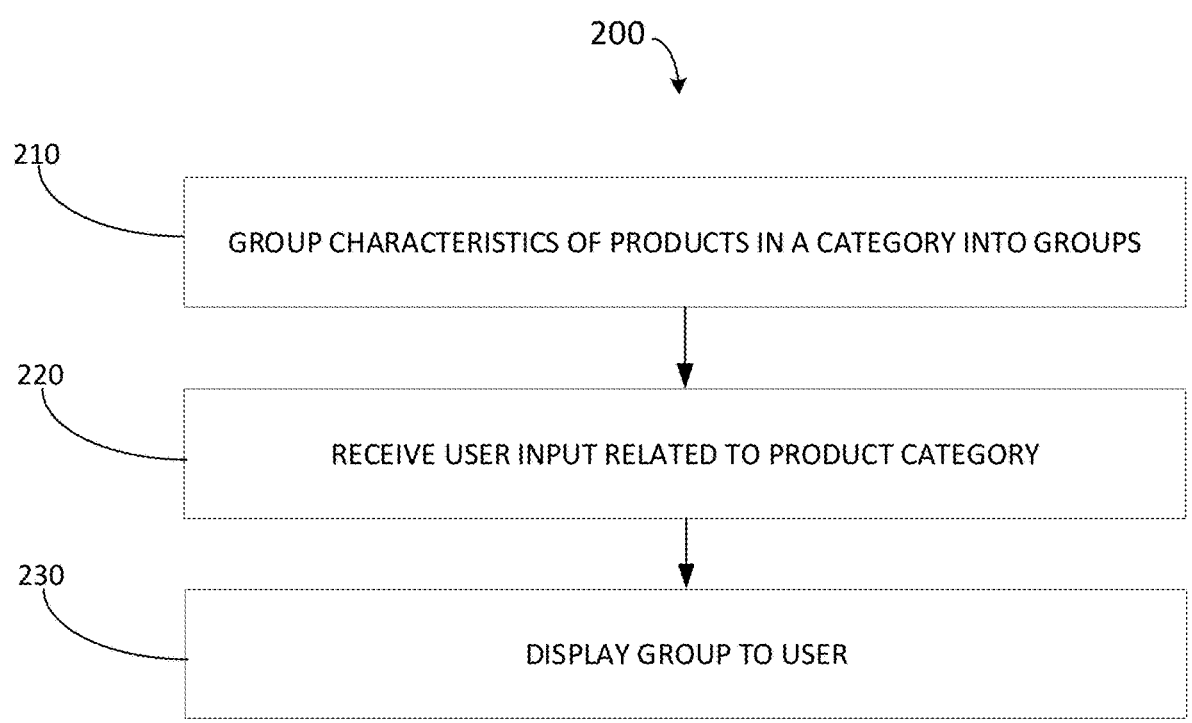
FIG. 2 is a flow chart illustrating an example method of providing a product recommendation to a user based on characteristics derived from end user-generated text.

FIG. 2 is a flow chart illustrating an example method 200 of providing a product recommendation to a user based on characteristics derived from end user-generated reviews. The method 200, or one or more portions of the method 200, may be performed by the system 100, and more particularly by the product grouping system 120, in some embodiments.

In some embodiments, characteristics may be specific to product category. The method 200 will be described below with respect to a single product category below. Accordingly, aspects of method 200 (blocks 210, 220, 230) may be repeated for each of one or more product categories, in some embodiments.

The method 200 may include, at block 210, grouping characteristics of products in a category into groups. Details of block 210 can be found in the methods 300, 400 of FIGS. 3 and 4. First, characteristics may be identified from user-generated text. Identifying characteristics may include using a trained QA model with questions crafted to derive features from product reviews (i.e., the end user-generated text). From there, characteristics may be grouped based on similarity. As discussed above with reference to the clustering module 124, the characteristics may be grouped based on a hierarchical clustering algorithm, which may begin with generating a respective embeddings vector representative of each characteristic. Once the characteristics are grouped, a respective representative characteristic may be determined for each group of characteristics. For example, if the characteristics in a group are similarly directed to a lawn mower's ability to mow on sloped areas, the representative characteristic may be "Great on Slopes." Following determination of a representative characteristic, for each group, a product may be determined that is representative of the group. In some embodiments, a representative product may be determined based on the representative characteristic. For example, the representative product may be the product from whose review the representative characteristic is derived, or may be the product in whose reviews the representative characteristic is most often found. In another example, the representative product may be the product within the group that is most frequently purchased, or may be the product within the group that is highest rated.

The method 200 may further include, at block 220, receiving a user input related to a product category through an electronic user interface. The user input may be, for example, a selection of a product (which product will be within a category), a selection of a page associated with the category, a search query for a particular category or a particular product, etc.

The method 200 may further include, at block 230, displaying one or more group(s) to a user in response to the user input received at block 250. Accordingly, block 250 may include determining one or more groups within the product category indicated by the user input, selecting one or more groups within that product category for display, and creating a display portion on the electronic user interface for presentation of the group(s) to the user. In some embodiments, displaying a group includes displaying the representative product for the group and labelling the representative product (or products) with the representative characteristic. In other embodiments, displaying the determined group(s) includes displaying the representative characteristic as an interactive link that, when interacted with, takes the user to a list of products in the respective group. An order of the products, in either embodiment, may be based on a relative purchase popularity within the group, or may be based on the frequency with which the characteristics are used to describe the products in reviews. For example, if reviews of Lawn Mower A mention that Lawn Mower A works well on slopes four times while reviews of Lawn Mower B mention that Lawn Mower B works well on slopes eight times, Lawn Mower B may be displayed more prominently than Lawn Mower A.

As noted above, a group may be displayed in response to an action by the user. For example, if the user performs a plaintext search on the website for "lawns mowers good at slopes," the search results that are displayed may be the products that correspond to a "Great at Slopes" characteristic group. In this way, the system 100 may be responsive to and interactive with the website's search capabilities. In another example, if a user has navigated to a product that is included within one or more groups, those groups may be displayed on the product's page as related products (e.g., "Other Lawn Mowers that are Great at Slopes").

In some embodiments, blocks 210, 220, and 230 may be performed continuously as new end user reviews are generated or received. In other embodiments, these clustering determinations may be performed on a time-based cycle (e.g., once per month) or a content-based cycle (e.g., after every 50 new reviews).

Figure 3:
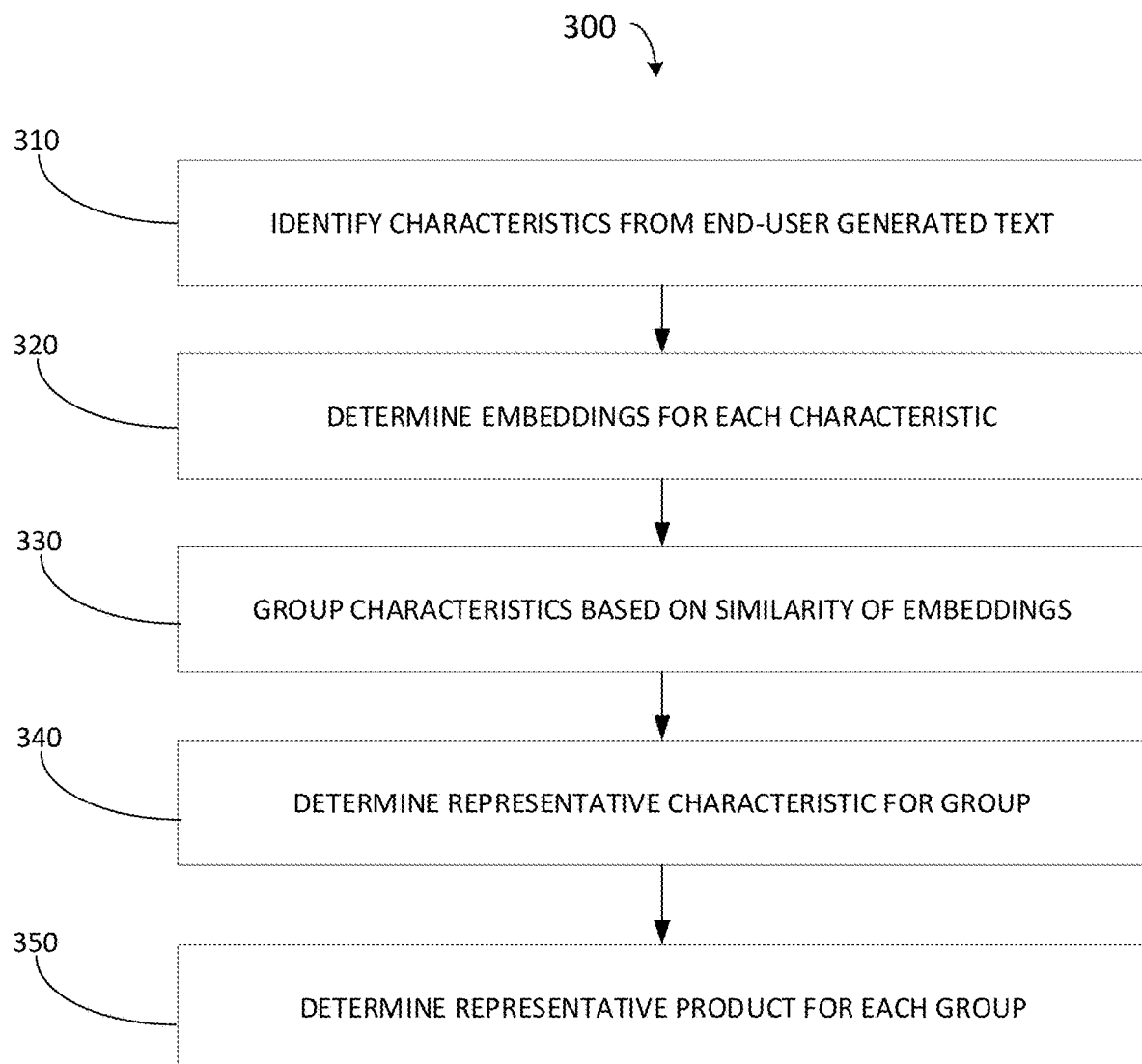
FIG. 3 is a flow chart illustrating an example method of determining characteristic groups for a plurality of products based on end user-generated text.

FIG. 3 is a flow chart illustrating an example method 300 of determining characteristic groups for a plurality of products based on end user-generated reviews. The method 300 may be performed by the system 100, and more particularly by the product grouping system 120, in some embodiments.

The method 300 may include, at block 310, identifying characteristics from end-user generated text. As discussed above with reference to the natural language processing module 122, characteristics may be identified using a trained QA model with questions crafted to derive features from product reviews (i.e., the end user-generated text). The QA model may be, for example, a BERT model. In some embodiments, the QA model may be trained to receive an end user-generated review of a product and to output one or more characteristics of the product described in the review. These characteristics may be indicative of features or qualities of the product, and may be objective qualities (e.g., "multi-functional," "rechargeable battery") or relative qualities (e.g., "budget-friendly," "most powerful"). In some embodiments, multiple characteristics may be derived from a single end user-generated text (e.g., a review mentions that the product is multi-functional as well as budget-friendly), while in other embodiments, a single characteristic is derived from each end user-generated text. In those embodiments in which multiple characteristics may be derived from a single end user-generated text, a single product associated with the end user-generated text may be assigned to multiple groups in accordance with the multiple characteristics.

In some embodiments, block 310 may include determining a confidence score associated with each identified characteristic. For example, the QA model may output, along with an identified characteristic, a confidence of the model that the characteristic was identified accurately.

The method 300 may also include, at block 320, determining an embedding for each characteristic and, at block 330, grouping similar embeddings. Determining an embedding for each characteristic may include inputting each characteristic into a universal sentence encoder. Once trained, a universal sentence encoder may be configured to receive input text and to output an embeddings vector representative of the input text.

Once the embeddings are determined, the embeddings may be grouped by similarity at block 330. Embedding similarity may be based on a determination of relative distances between embeddings vectors. Distances may be calculated according to a cosine similarity, Euclidean distance, or other appropriate multi-dimensional distance calculation. In some embodiments, the relative distance of each embedding may be determined relative to every other embedding, and pairs of embeddings that closer to each other than a threshold value may be assigned to a common group. In these embodiments, each cluster may comprise embeddings that each are within a threshold distance to every other embedding in the cluster. This threshold value may be pre-determined, or may be based on a silhouette score, such that a threshold value is chosen to maximize the silhouette score.

In other embodiments, embeddings may be grouped by selecting an initial embedding and grouping all embeddings that are similar to the initial embedding. The initial embedding may be selected arbitrarily or may be based on a confidence score associated with the embedding. Once selected, a cosine similarity value (or Euclidean distance value) may be determined for the initial embedding relative to every other embedding, and every embedding with a cosine similarity relative to the initial embedding that is above a threshold value may be clustered with the initial embedding. In some embodiments, a single embeddings may be assigned to multiple groups, provided that the particular embeddings is within a threshold distance of multiple other embeddings. However, in other embodiments, a single embeddings may be assigned to a single group, which is the group to whose initial embeddings vector the single embeddings is closest. This process may then be repeated for all remaining embeddings, with a new initial embedding selected from the remaining embeddings.

The method 300 may further include, at block 340, determining a characteristic that is representative of each group. The representative characteristic may be determined based on frequency, such that the representative characteristic is the characteristic that appears most frequently in the group (i.e., the representative characteristic is mentioned the most in the product reviews from which the characteristics were extracted or determined). The representative characteristic may further be determined based on a clarity with which one or more users identified the characteristic, such that the representative characteristic may be the characteristic in the group with the highest identification confidence score at block 310, or may be the characteristic with the lowest average distance from other characteristics within the group (e.g., is closest to the relative center of the group's embeddings).

In some embodiments, once the representative characteristic is determined, the clustering process (e.g., block 330) may be repeated for each embeddings vector by comparing each embeddings vector to the determined representative characteristics. If an embeddings vector is within a threshold distance of a representative characteristic, the characteristic associated with the embeddings vector may be assigned to the group associated with the representative characteristic.

By clustering according to such an iterative process, the clustering module 124 may account for those user-generated text in which multiple characteristics are mentioned.

In some embodiments, as a result of method 300, each characteristic may belong to zero or one groups. For example, each characteristic may be assigned to the group to which it is closest, in some embodiments. In other embodiments, characteristics that are within a threshold distance of a group may be assigned to that group, and characteristics that are within a threshold distance of multiple groups may be assigned to the closest of those multiple groups.

The method 300 may further include, at block 350, determining a product that is representative of the group. Each of the characteristics included within a group may have been derived from a review of a particular product, such that each characteristic may be associated with the product that was reviewed. Therefore, the group of characteristics may correspond with a group of products, with each product in the group of products being associated with at least one of the characteristics in the group of characteristics. In some embodiments, a representative product may be determined based on the representative characteristic. For example, the representative product may be the product from whose review the representative characteristic is derived, or may be the product in whose reviews the representative characteristic is most often found. In other embodiments, the representative product may be determined without regard to the associated characteristics. For example, the representative product may be the product within the group that is most frequently purchased, or may be the product within the group that is highest rated.

Figure 4:
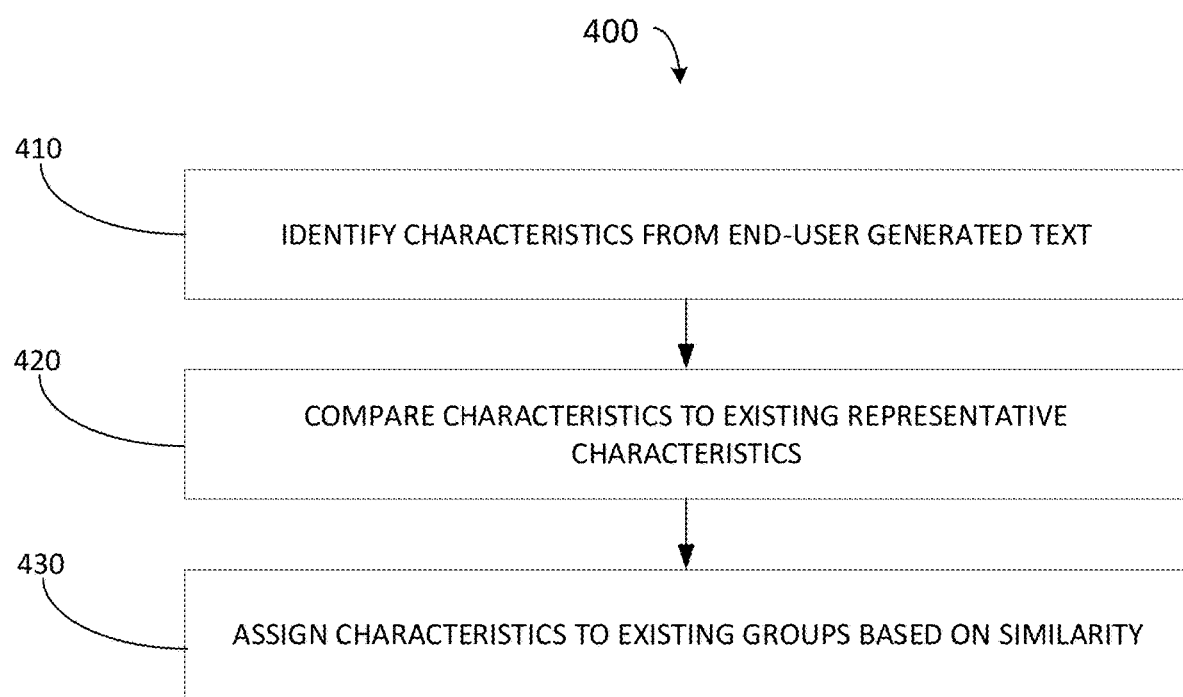
FIG. 4 is a flow chart illustrating an example method of updating characteristic groups for a plurality of products based on end user-generated text.

FIG. 4 is a flow chart illustrating an example method 400 of updating characteristic groups for a plurality of products based on end user-generated reviews. In some embodiments, method 400 may be performed after method 300, to add characteristics to groups that may not have qualified for those groups based on distance, as described above. Accordingly, after method 400, one or more characteristics may belong to two or more groups.

The method 400 may include, at block 410, identifying characteristics from end-user generated text. Similarly to block 210 of method 200 and block 310 of method 300, identifying characteristics may include using a trained QA model with questions crafted to derive features from product reviews (i.e., the end user-generated text). In some embodiments, multiple characteristics may be derived from end user-generated text (e.g., a review mentions that the product is multi-functional as well as budget-friendly), while in other embodiments, a single characteristic is derived from each end user-generated text.

The method 400 may also include, at block 420, comparing identified characteristics (e.g., identified according to block 310 of method 300) to representative characteristics (e.g., determined at block 340 of method 300) of each group. In some embodiments, a pairwise similarity may be determined among all characteristics and all groups.

The method 400 may further include, at block 430, assigning the new characteristics to groups based on the determined similarity. In those embodiments in which a cosine similarity is determined for every representative characteristic, the new characteristic may be assigned to the group that is represented by the representative characteristic corresponding to the highest cosine similarity. In those embodiments in which cosine similarity is determined until the threshold value is exceeded, the new characteristic may be assigned to the group that is represented by the representative characteristic corresponding to the threshold-exceeding cosine similarity.

Determining product groups or clusters according to methods 200 and 300 may provide numerous benefits over existing product grouping methods. First, because products may be grouped based on end user-generated reviews, the groupings may provide a more initially-relevant set of products for a user than existing methods, which often provide recommendations only in response to the selection of an initial product. In contrast, the products that may be presented as part of a group here are presented as possessing a particular characteristic, which is more helpful for a user who is starting their browsing. Second, because products may be grouped based on both objective and qualitative features, the product groups or clusters generated here more completely convey to users which product is best-suited for their needs, rather than existing methods that only convey to users which product could be suited for their needs. Third, by integrating the product clustering system into the existing framework for soliciting and receiving product reviews, the overall strain on the server 130 or other computing device is reduced, thereby improving the functioning of the server 130 and product grouping system 120 without overwhelming their processing capabilities. Fourth, by improving and streamlining the users' experiences on the website, the processing strain on the server 130 is reduced, and overall performance of the server 130 (e.g., loading webpages, loading content, processing interactions) is improved. In particular, because product groupings that convey product features to users are more directly and easily accessible to these users, users are able to locate a desired product more quickly than if the user were to manually access and read through product descriptions and reviews. For example, if a user accessing the website looking to find a lawn mower that is well-suited for their heavily-sloped lawn and is immediately presented with "Lawn Mowers that are Great at Slopes" upon accessing the website, the user is likely to spend less time browsing and searching through the website, reducing their length of stay without losing a sale.

Updating product clusters according to method 400 may offer numerous advantages over known product grouping approaches. First, as discussed above with reference to methods 200 and 300, by grouping products together based on end user-generated text rather than using existing techniques enables a more accurate and helpful set of product clusters. Second, by building upon clusters of products that have already been determined, less computing power is used, which not only improves processing time for the method 400 but also reduces the overall strain on the server 130.

Figure 5:
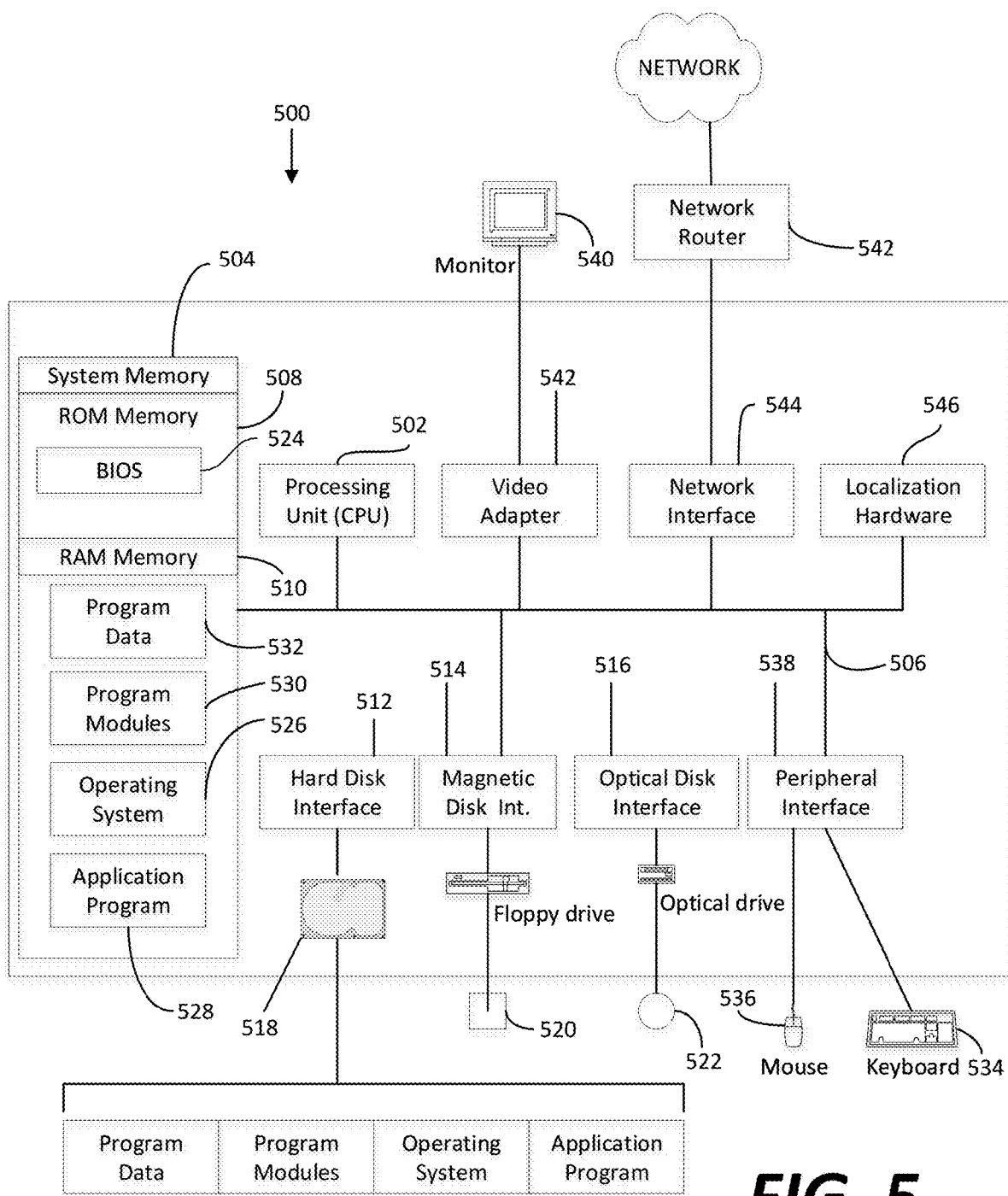
FIG. 5 is a diagrammatic view of an example embodiment of a user computing environment.

FIG. 5 is a diagrammatic view of an example embodiment of a user computing environment that includes a computing system environment 500, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 500 typically includes at least one processing unit 502 and at least one memory 504, which may be linked via a bus. Depending on the exact configuration and type of computing system environment, memory 504 may be volatile (such as RAM 510), non-volatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus, respectively, allow for reading from and writing to a hard disk 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard disk 518, and/or peripheral memory devices may be used to store computer executable instructions comprising an operating system 526, one or more applications programs 528 (which may include the functionality of the product grouping system 120 of FIG. 1 or one or more of its functional modules 506, 508, for example), other program modules 530, and/or program data 532. Still further, computer-executable instructions may be downloaded to the computing environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus via an interface, such as via video adapter 532. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such a network router 542, that is responsible for network routing. Communications with the network router 542 may be performed via a network interface component 544. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 556 for determining a location of the computing system environment 500. In embodiments, the localization hardware 556 may include, for example only, a GPS antenna, an RFID chip or reader, a WiFi antenna, or other computing hardware that may be used to capture or transmit signals that may be used to determine the location of the computing system environment 500.

The computing environment 500, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method comprising:
   (i) applying, to respective end user-generated text associated with each product of a plurality of products, a machine learning model trained to output portions of the end user-generated text that include a plurality of characteristics associated with the plurality of products;
   (ii) generating a plurality of embeddings vectors, each of the plurality of embeddings vectors representative of a respective one of the plurality of characteristics;
   (iii) identifying an initial vector of the plurality of embeddings vectors as having a shortest average distance to the plurality of embeddings vectors;
   (iv) defining an initial cluster of embeddings vectors as the plurality of embeddings vectors within a threshold distance of the initial vector, the initial cluster being a first cluster in one or more clusters;
   (v) identifying a further vector of the plurality of embeddings vectors having a shortest average distance to the plurality of embeddings vectors not in a cluster of the one or more clusters;
   (vi) defining a further cluster of embeddings vectors as the plurality of embeddings vectors within a threshold distance of the further vector and adding the further cluster to the one or more clusters;
   (vii) repeating (v) and (vi) until each of the plurality of embeddings vectors is within a cluster of the one or more clusters;
   (viii) receiving an input related to a product category; and
   (ix) generating and presenting a graphical user interface that includes a respective product from the defined cluster associated with the product category.

2. The method of claim 1, wherein each of the plurality of characteristics comprises one or more plaintext words from the end user-generated text.

3. The method of claim 1, further comprising: determining a respective representative word for each cluster of the one or more clusters; determining a pairwise similarity of each characteristic to the representative word for each cluster; and adding products to the plurality of clusters according to matches in the pairwise similarity.

4. The method of claim 3, wherein the representative word of the first cluster corresponds to the first vector.

5. The method of claim 1, further comprising: selecting, for each cluster of the one or more clusters, a respective representative product according to one or more of respective popularities of the products within the group or a confidence score associated with the determination of the characteristic from the end user-generated text associated with the product.

6. The method of claim 1, wherein the plurality of products are within a same product category.

7. The method of claim 1, wherein the machine learning model is a natural language processing model.

8. A system for generating a related product interface portion in an electronic user interface based on user text, the system comprising:
   a non-transitory, computer-readable medium storing instructions; and
   a processor configured to execute the instructions to:
      (i) apply, to respective end user-generated text associated with each product of a plurality of products, a machine learning model trained to output portions of the end user-generated text that include a plurality of characteristics associated with the plurality of products;
      (ii) generate a plurality of embeddings vectors, each of the plurality of embeddings vectors representative of a respective one of the plurality of characteristics;
      (iii) identify an initial vector of the plurality of embeddings vectors as having a shortest average distance to the plurality of embeddings vectors;
      (iv) define an initial cluster of embeddings vectors as the plurality of embeddings vectors within a threshold distance of the initial vector, the initial cluster being a first cluster in one or more clusters;
      (v) identify a second vector of the plurality of embeddings vectors having a shortest average distance to the plurality of embeddings vectors not in the first cluster;
      (vi) define a further cluster of embeddings vectors as the plurality of embeddings vectors within a threshold distance of the further vector and add the further cluster to the one or more clusters;
      (vii) repeat steps (v) and (vi) until each of the plurality of embeddings vectors is within a cluster of the one or more clusters;
      (viii) receive an input related to a product category; and
      (ix) generate and present a graphical user interface that includes a respective product from the defined cluster associated with the product category.

9. The system of claim 8, wherein each of the plurality of characteristics comprises one or more plaintext words from the end user-generated text.

10. The system of claim 8, wherein the instructions further cause the processor to: determine a respective representative word for each cluster of the one or more clusters; determine a pairwise similarity of each characteristic to the representative word for each cluster; and add products to the plurality of clusters according to matches in the pairwise similarity.

11. The system of claim 10, wherein the representative word of the first cluster corresponds to the first vector.

12. The system of claim 8, wherein the instructions further cause the processor to: select, for each cluster of the one or more clusters, a respective representative product according to one or more of respective popularities of the products within the group or a confidence score associated with the determination of the characteristic from the end user-generated text associated with the product.

13. The system of claim 8, wherein the plurality of products are within a same product category.

14. The system of claim 8, wherein the machine learning model is a natural language processing model.

15. A non-transitory computer-readable storage medium storing program instructions that, when executed by a processor, cause a computer system to perform operations comprising:

(i) applying, to respective end user-generated text associated with each product of a plurality of products, a machine learning model trained to output portions of the end user-generated text that include a plurality of characteristics associated with the plurality of products;

(ii) generating a plurality of embeddings vectors, each of the plurality of embeddings vectors representative of a respective one of the plurality of characteristics;

(iii) identifying an initial vector of the plurality of embeddings vectors as having a shortest average distance to the plurality of embeddings vectors;

(iv) defining an initial cluster of embeddings vectors as the plurality of embeddings vectors within a threshold distance of the initial vector, the initial cluster being a first cluster in one or more clusters;

(v) identifying a further vector of the plurality of embeddings vectors having a shortest average distance to the plurality of embeddings vectors not in a cluster of the one or more clusters;

(vi) defining a further cluster of embeddings vectors as the plurality of embeddings vectors within a threshold distance of the further vector and adding the further cluster to the one or more clusters;

(vii) repeating steps (v) and (vi) until each of the plurality of embeddings vectors is within a cluster of the one or more clusters;

(viii) receiving an input related to a product category; and (ix) generating and presenting a graphical user interface that includes a respective product from the defined cluster associated with the product category.

16. The non-transitory computer-readable storage medium of claim 15, wherein each of the plurality of characteristics comprises one or more plaintext words from the end user-generated text.

17. The non-transitory computer-readable storage medium of claim 15, wherein the operations further comprise: determining a respective representative word for each cluster of the one or more clusters; determining a pairwise similarity of each characteristic to the representative word for each cluster; and adding products to the plurality of clusters according to matches in the pairwise similarity.

18. The non-transitory computer-readable storage medium of claim 15, wherein the operations further comprise: selecting, for each cluster of the one or more clusters, a respective representative product according to one or more of respective popularities of the products within the group or a confidence score associated with the determination of the characteristic from the end user-generated text associated with the product.

19. The non-transitory computer-readable storage medium of claim 15, wherein the plurality of products are within a same product category.

20. The non-transitory computer-readable storage medium of claim 15, wherein the machine learning model is a natural language processing model.

* * * * *